United States Patent [19]

Bhatti et al.

[11] 4,427,428
[45] * Jan. 24, 1984

[54] FEEDER FOR FORMING GLASS FIBERS AND METHOD FOR MAKING FEEDER

[75] Inventors: Mohinder S. Bhatti; Alfred Marzocchi, both of Newark, Ohio

[73] Assignee: Owens-Corning Fiberglas Corporation, Toledo, Ohio

[*] Notice: The portion of the term of this patent subsequent to Sep. 7, 1999 has been disclaimed.

[21] Appl. No.: 378,050

[22] Filed: May 14, 1982

Related U.S. Application Data

[63] Continuation of Ser. No. 200,650, Oct. 27, 1980, Pat. No. 4,348,216.

[51] Int. Cl.³ .................................... C03B 37/095
[52] U.S. Cl. .................................... 65/1; 29/163.5 R; 65/2; 65/374.12; 428/670; 428/940
[58] Field of Search .................. 65/1, 2, 374.12; 29/163.5 R; 219/121 EM; 428/670, 940

[56] References Cited

U.S. PATENT DOCUMENTS

| | | | |
|---|---|---|---|
| 2,555,372 | 6/1951 | Ramage | 204/38 |
| 2,777,254 | 1/1957 | Siefert et al. | |
| 3,132,928 | 5/1964 | Crooks et al. | 29/198 |
| 3,134,659 | 5/1964 | Labino | 65/2 |
| 3,147,547 | 9/1964 | Kuebrich et al. | 29/528 |
| 3,157,482 | 11/1964 | Nero et al. | 65/17 |
| 3,206,846 | 9/1965 | Slayter et al. | 29/470 |
| 3,235,646 | 2/1966 | Sens | 13/6 |
| 3,248,190 | 4/1966 | Woodward et al. | 65/1 |
| 3,371,409 | 3/1968 | Bonnet et al. | 29/528 |
| 3,461,058 | 8/1969 | Westfield et al. | 204/290 |
| 3,480,523 | 11/1969 | Tyrrel | 204/43 |
| 3,511,306 | 5/1970 | Warkoczewski | 65/15 |
| 3,518,066 | 6/1970 | Bronnes et al. | 29/195 |
| 3,657,784 | 4/1972 | Selman et al. | 29/195 |
| 3,736,109 | 5/1973 | Darling et al. | 29/195 |
| 3,741,735 | 6/1973 | Buttle | 29/198 |
| 3,827,953 | 8/1974 | Haldeman | 204/37 R |
| 3,875,028 | 4/1975 | Atlee et al. | 204/37 R |
| 3,947,333 | 3/1976 | Bianchi et al. | 204/129 |
| 3,971,646 | 7/1976 | Rhodes | 65/157 |
| 3,973,920 | 8/1976 | Tadokoro et al. | 29/194 |
| 4,036,601 | 7/1977 | Welmar et al. | 428/663 |
| 4,066,864 | 1/1978 | Heitmann | 219/121 EM |
| 4,105,828 | 8/1978 | Borchert et al. | 428/665 |
| 4,140,507 | 2/1979 | Costin et al. | 65/2 |

FOREIGN PATENT DOCUMENTS

| | | | |
|---|---|---|---|
| 1033627 | 6/1966 | United Kingdom | 65/1 |
| 1242921 | 8/1971 | United Kingdom | 65/1 |

OTHER PUBLICATIONS

Hot Isostatic Processing, MCIC-77-34, Battele Labs, Columbus, Ohio, Nov. 1977, pp. 1-99.

Primary Examiner—Robert L. Lindsay, Jr.
Attorney, Agent, or Firm—Ronald C. Hudgens; Robert F. Rywalski; Greg Dziegielewski

[57] ABSTRACT

A laminated wall for a feeder for supplying molten streams of glass to be attenuated into fibers is provided comprising a refractory metal core having an oxygen impervious, precious metal sheath intimately bonded thereto by hot isostatic pressing, said core having an insert therein having at least one orifice extending therethrough adapted to pass said molten material therethrough.

13 Claims, 6 Drawing Figures

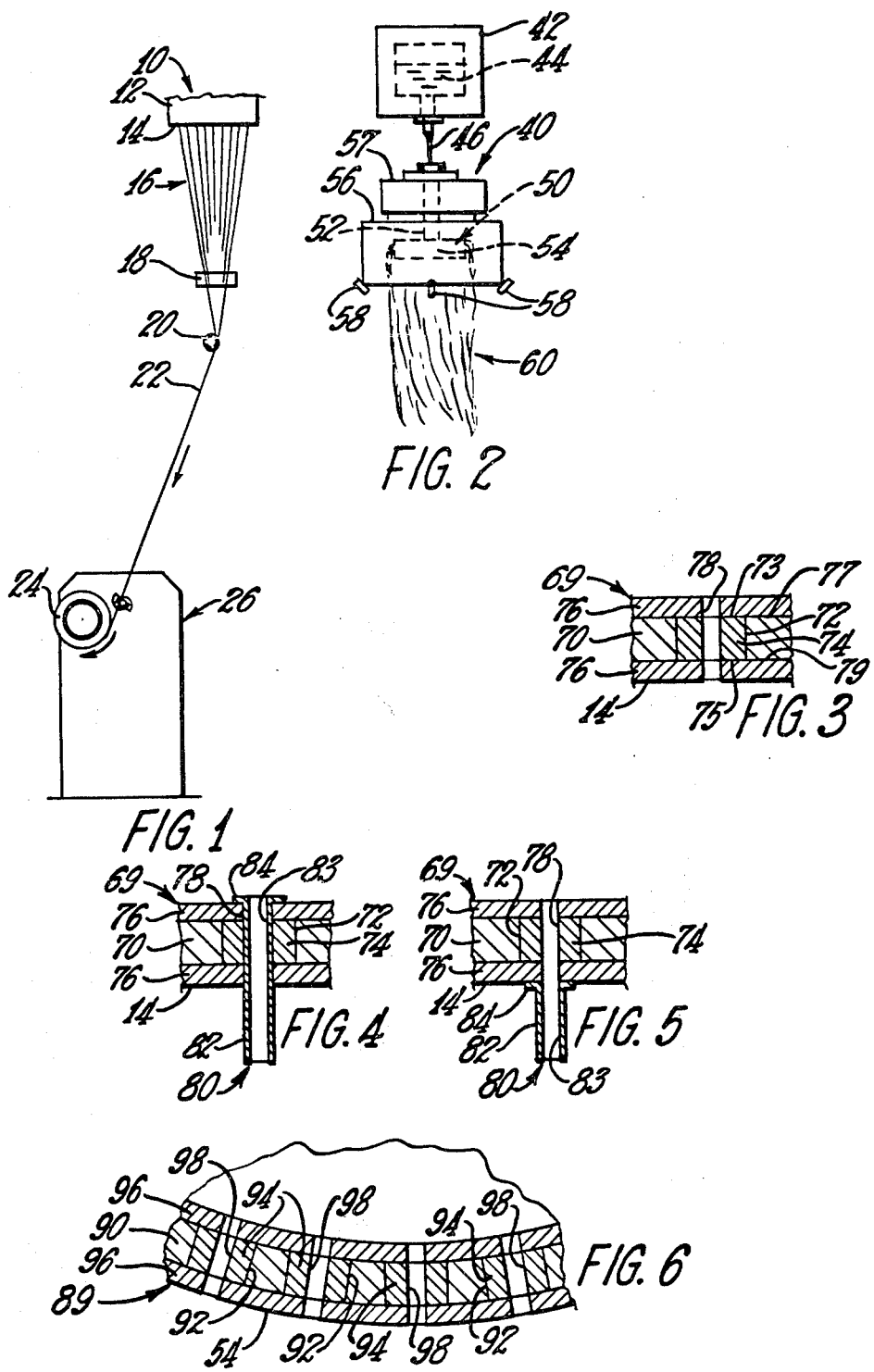

FEEDER FOR FORMING GLASS FIBERS AND METHOD FOR MAKING FEEDER

This is a continuation of application Ser. No. 200,650, filed Oct. 27, 1980 now U.S. Pat. No. 4,348,216 granted Sept. 7, 1982.

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate.

BACKGROUND ART

There has been a long-felt need to produce a long lasting feeder for flowing streams of molten inorganic material, such as glass, at operating temperatures higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and for longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious precious metal sheath intimately bonded thereto by hot isostatic pressing, said wall having at least one orifice extending therethrough adapted to pass said molten material therethrough.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an enlarged cross sectional view of the orificed walls of the stream feeders shown in FIGS. 1 and 2.

FIG. 4 is an enlarged cross sectional view of a portion of the feeder wall similar to FIG. 3 having a hollow tubular member inserted therethrough.

FIG. 5 is an enlarged cross sectional view of a feeder wall similar to that shown in FIG. 3 having a hollow tubular member externally attached thereto.

FIG. 6 is a cross sectional view of the feeder wall of the fiber forming system shown in FIG. 2.

BEST MODE OF CARRYING OUT THE INVENTION

As shown in FIG. 1, feeder 10, which is comprised of containment or sidewalls 12 and a bottom, working or stream defining wall 14, is adapted to provide a plurality of streams of molten inorganic material, such as glass.

The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds, is comprised of a quill 52 and a circumferential stream defining or working wall 54 having a plurality of orifices 78 or passageways 98 therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58, as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in concurrently filed patent application Ser. No. 200,677, filed on Oct. 27, 1980, in the name of Mohinder S. Bhatti, which is hereby incorporated by reference.

Particularly, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals are selected from a group consisting of platinum (Pt), paladium (Pd), irradium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively.

As disclosed in the aforementioned concurrently filed patent application, care should be taken in the preparation of the surfaces of the substrate and precious metal layers to insure a good bond between the core and sheath.

Simply stated, the sheath is formed to closely conform to the exterior of the core, with the surfaces thereof being appropriately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

As shown in FIG. 3, bottom wall 14 is comprised of a laminant 69 adapted to flow molten glass therethrough. As such, core or substrate 70 is provided with a plurality of apertures 72 therethrough by any suitable means, such as drilling.

An insert or element 74 is positioned in or press fit into each of the apertures 72 in core 70. To ensure a snug fit between the element 74 and core 70 a press fit is preferred. The planar end surfaces 73 and 75 of element 74 should be substantially flush or coplanar with the planar surfaces of the core 70. That is, preferably, the plugs are formed having an axial height substantially equal to the thickness of core 70. Each element can be a cylindrically shaped solid plug of precious metal adapted to snugly fit within each aperture 72. If the plug is longer than the thickness of core 70, any excess insert extending out of aperture 72 is preferably removed.

Subsequent to the insertion of elements 74, a sheath 76 is fabricated or formed around core 70. Sheath 76 should be formed by a precious metal as set forth in the aforementioned concurrently filed patent application.

That is, sheath 76 should be comprised of a "picture or window frame" of precious metal around the lateral edges of the core sandwiched between a pair of precious metal plates which are welded or joined together so as to hermetically seal the interior of the unit from the atmosphere and/or HIP'ing fluid. Then the unit is hot isostatically pressed to form a laminate 69 having superior high temperature strength and creep characteristics capable of function in an oxidizing atmosphere at elevated temperatures, for example temperatures above 1000° C., such as encountered in the fiberization of glass filaments.

As shown in the drawings, the substantially parallel or end surfaces 73 and 75 of each element or plug 74 are intimately bonded to the interior surfaces 77 and 79 of sheath 76 after HIP'ing. Each of the end surfaces of each plug being substantially coplanar with the side of sheath 76 associated therewith.

At least one orifice 78 is formed through element 74, preferably, without exposing any of the refractory metal core 70 to form working wall 14.

Working wall 14 can be combined with sidewalls 12 to form a textile type feeder 10 having a tipless bottom wall. Or, a hollow tubular member or tip 80 can be attached to the laminate 69 to form a "tip-type" working wall 14 as shown in FIGS. 4 and 5. Preferably, the hollow tubular member 80 and element 74 are also formed of one of the aforementioned precious metals or base alloys thereof, such as platinum.

As shown in FIG. 4, the shaft 82 of hollow tubular member 80 is positioned within orifice 78 of laminate 69. Further, the flange 84 of member 80 is positioned in abutting engagement with one side of sheath 76 and is subsequently sealed to said sheath 76 by any suitable means such as by electron beam or laser welding.

The portion of shaft 82 extending beyond the opposite surface of sheath 76 forms the "tip" and passageway 83 through member 80 is adapted to permit the passage of molten glass or inorganic material therethrough to issue a stream therefrom.

Preferably, instead of electron beam or laser welding flange 84 to sheath 76, hollow tubular member 80 can be gas pressure welded or HIP welded to laminate 69, in conformance with the Metals and Ceramics Information Center Report No. MCIC-77-34 published by the Battelle Columbus Laboratories in November, 1977.

With the tubular member 80 inserted in the laminate 69 as shown in FIG. 4, the laminate 69 and all such members 80 are placed inside a sheet metal container having a pressure transmitting media tightly packed between the container and the laminate 69 and in the passageway 83 of each tubular member 80. That is, the pressure transmitting media is tightly packed in all the space within the container not occupied by the laminate 69 and tubular members 80.

The pressure transducing or transmitting media can be of the type known in the art such as powdered metal, beaded glass such as "Vycor," or amorphous silica. Preferably, passageways 83 are snugly fitted with a solid or fully densified rod of the pressure transducing media, metal or silica, which fluidizes or softens upon the application of heat and pressure during the HIP'ing process as should the rest of the transmitting medium, to insure a full application of pressure to the walls of shaft 82 to intimately bond the exterior of shaft 82 to the interior of element 74.

Preferably, the pressure transmitting media should not become, so fluid as to "wick" or flow between the surfaces to be bonded together.

Subsequently, the pressure transmitting media is removed by any suitable means, such as leaching.

It is to be noted that the elements 74 and/or members 84 may be HIP welded to laminate 69 and/or each other if the flanges 78, 79 and 87 are hermetically sealed or welded (e.g. EB welded) to laminate 69, in the argon fluid of a conventional HIP'ing system. That is, the sheet metal box and special pressure transducing media may be dispensed with.

Thus, with HIP welding, flange 84 is metallurgically bonded to sheath 76, and shaft 82 is metallurgically bonded to element 74 to provide a laminated feeder fiberization wall 14 wherein the tubular member 80 is in good electrical and thermal contact with laminate 69.

As shown in FIG. 5, modified laminate 69, having core 70, element 74, sheath 76 fabricated as set forth herein, is provided with a hollow tubular member 80 depending from one side of sheath 76. Preferably, member 80 is attached to the non-glass contacting side of the fiber forming feeder.

As such, flange 84 can be welded to sheath 76 by any suitable means such as resistance, electron beam, laser, or HIP welding.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus finshield alignments and the like with respect to the fiberization wall and/or tips can remain essentially fixed over the life of the feeder.

Similarly, a rotary feeder 50 can be fabricated from a laminate 89 comprised of a refractory metal core or substrate 90 intimately bonded to precious metal sheath 96 by means of hot isostatic pressing. The fabrication steps for the rotary feeder are substantially the same as the foregoing disclosed for feeder 10 wherein aperture 92 is first formed in substrate 90 with element or insert 94 being press fit or snugly positioned therein.

Then, a sheath is formed around core 90 having element 94 inserted therein. After HIP'ing, orifice 98 can be formed in element 94 to permit the passage of molten glass therethrough. Preferably, there should be no points at which the core is exposed to an oxidizing medium or atmosphere. That is, orifice 98 should be drilled entirely within the circumferential wall of element 94.

It is to be understood that insert elements 74 and 94 need not be solid plugs of precious metal material, but elements 74 and 94, prior to the insertion thereof in core 70 and core 90, may have passageways 83 and 98 previously established therein. Further, the fiberization wall 54 may be adapted with elements 84 and/or 94 if desired.

Other systems for producing a feeder working wall having a precious metal liner insert or tubular member associated therewith are found in concurrently filed patent applications: Ser. No. 200,650, filed on Oct. 27, 1980, in the names of Mohinder S. Bhatti and Alfred Marzocchi; Ser. No. 200,647, filed on Oct. 27, 1980 in the name of Mohinder S Bhatti; Ser. No. 200,651, filed on Oct. 27, 1980, in the name of Mohinder S. Bhatti, all of which are hereby incorporated by reference.

It is apparent that within the scope of the invention, modifications and different arrangements can be made other than as herein disclosed. The present disclosure is merely illustrative with the invention comprehending all variations thereof.

INDUSTRIAL APPLICABILITY

The invention disclosed herein is readily applicable to the glass fiber industry.

We claim:

1. A feeder for supplying streams of molten glass to be attenuated into filaments comprising:
a plurality of layers of material wherein one of said layers is a refractory metal and another of said layers is an oxygen impervious, precious metal, said plurality of layers being intimately bonded together by the application of isostatic pressure and heat to form a unitary laminate, said laminate having a plurality of apertures extending therethrough; and
a plurality of elements bonded to the laminate and positioned in said apertures to prevent the oxidation of the refractory metal at elevated temperatures, said elements having (a) an orifice adapted to permit the molten glass to flow therethrough to provide said streams of molten glass and (b) an end surface bonded to the innermost surface of the precious metal layer.

2. A feeder for flowing a stream of molten inorganic material therethrough comprising:
a plurality of layers of material wherein one of said layers is a refractory metal and another of said layers is an oxygen impervious, precious metal, said plurality of layers being intimately bonded together by the application of isostatic pressure and heat to form a unitary laminate, said laminate having an aperture extending therethrough; and
an element bonded to the laminate and positioned in said aperture to prevent the oxidation of the refractory metal at elevated temperatures, said element having (a) an orifice adapted to permit the molten material to flow therethrough and (b) an end surface bonded to the innermost surface of the precious metal layer.

3. The feeder of claims 1 or 2 wherein said refractory metal and said precious metal are intimately bonded together.

4. The feeder of claim 3 where said refractory metal and said precious metal are metalurgically bonded together.

5. The feeder of claims 1 or 2 wherein said plurality of layers include a plurality of precious metal layers positioned at the exterior of said laminate.

6. The feeder of claim 5 wherein said elements have two end surfaces intimately bonded to the inner surfaces of opposing layers of said precious metal.

7. The feeder of claims 1 or 2 wherein the refractory metal layer is a material selected from the group consisting of Ti, V, Cb, Ta, Cr, Mo, W, Re and base alloys thereof and wherein said precious metal layer is a material of the group consisting of Pt, Pd, Ir, Os, Rh, Ru and base alloys thereof.

8. The feeder of claim 7 wherein said element is a material of the group consisting of Pt, Pd, Ir, Os, Rh, Ru and base alloys thereof and wherein said element is intimately bonded to said refractory metal.

9. A method of making a feeder for supplying streams of molten glass to be attenuated into filaments comprising:
assembling a plurality of layers of material wherein one of said layers is a refractory metal and another of said layers is a precious metal; said refractory metal layer having a plurality of apertures having elements positioned therein;
isostatically pressing said plurality of layers;
heating the isostatically pressed layers to intimately bond the plurality of layers to form a unitary laminate and to bond end surfaces of the elements in said apertures to the inner surface of the precious metal layer; and
forming an orifice in said elements to permit the molten glass to issue therefrom as said streams, said precious metal layer and said elements preventing the oxidation of said refractory metal layer at elevated temperatures.

10. A method of making a feeder for flowing a stream of molten inorganic material therethrough comprising:
assembling a plurality of layers of material wherein one of said layers is a refractory metal and another of said layers is a precious metal, said refractory metal layer having an aperture having an element positioned therein;
isostatically pressing said plurality of layers;
heating the isostatically pressed layers to intimately bond the plurality of layers to form a unitary laminate and to bond an end surface of the element in said aperture to the inner surface of the precious metal layer; and;
forming an orifice in said element to permit the molten material to flow therethrough, said precious metal layer and said element preventing the oxidation of said refractory metal layer at elevated temperatures.

11. The method of claim 10 wherein the refractory metal layer is a material selected from the group consisting of Ti, V, Cb, Ta, Cr, Mo, W, Re and base alloys thereof and wherein said precious metal layer and said element are a material of the group consisting of Pt, Pd, Ir, Os, Rh, Ru and base alloys thereof.

12. The method of claim 11 wherein the refractory metal is intimately bonded to said precious metal.

13. The method of claim 12 wherein the refractory metal is diffusion bonded to said precious metal.

* * * * *